(12) United States Patent
Hauser

(10) Patent No.: US 10,956,005 B2
(45) Date of Patent: Mar. 23, 2021

(54) DEVICE, METHOD AND GRAPHICAL USER INTERFACE FOR DELETING AN OBJECT IN A USER INTERFACE

(71) Applicant: PayPal, Inc., San Jose, CA (US)

(72) Inventor: Vincent Hauser, Sundbyberg (SE)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 16/308,926

(22) PCT Filed: Jul. 8, 2016

(86) PCT No.: PCT/EP2016/066235
§ 371 (c)(1),
(2) Date: Dec. 11, 2018

(87) PCT Pub. No.: WO2018/006971
PCT Pub. Date: Jan. 11, 2018

(65) Prior Publication Data
US 2019/0146661 A1 May 16, 2019

(51) Int. Cl.
*G06F 3/0484* (2013.01)
*G06F 3/0488* (2013.01)
*G06F 3/01* (2006.01)

(52) U.S. Cl.
CPC .......... *G06F 3/04842* (2013.01); *G06F 3/016* (2013.01); *G06F 3/0488* (2013.01); *G06F 3/04883* (2013.01); *G06F 2203/014* (2013.01)

(58) Field of Classification Search
CPC .... G06F 3/04842; G06F 3/016; G06F 3/0488; G06F 3/04883; G06F 2203/014
See application file for complete search history.

(56) References Cited

U.S. PATENT DOCUMENTS

| 9,733,739 B1* | 8/2017 | Yates | G06F 3/0412 |
| 2008/0295015 A1* | 11/2008 | Liu | G06F 3/04895 715/772 |
| 2012/0218190 A1* | 8/2012 | Pechanec | G06F 3/0416 345/173 |
| 2013/0215059 A1* | 8/2013 | Lim | G06F 3/04883 345/173 |
| 2015/0009134 A1 | 1/2015 | Hiratsuka | |
| 2015/0149964 A1 | 5/2015 | Bernstein et al. | |
| 2016/0062598 A1* | 3/2016 | Kocienda | G06F 3/04817 715/765 |
| 2017/0039753 A1* | 2/2017 | Chu | G06T 13/80 |

OTHER PUBLICATIONS

International Search Report received in corresponding International Application No. PCT/EP2016/066235 dated Oct. 27, 2016.
(Continued)

*Primary Examiner* — Andrew T Chiusano

(57) ABSTRACT

The disclosure generally relates to the field of graphical user interfaces and particular it relates to a method of deleting a graphical user interface object, and to a corresponding electronic device and computer program. In particular the disclosure relates to a method, at an electronic device with a touch display and at least one user feedback mechanism for deleting a user interface object, wherein user feedback is provided, in response to the, facilitated by one of the at least one of the user feedback mechanisms.

14 Claims, 6 Drawing Sheets

(56) References Cited

OTHER PUBLICATIONS

Wrtten Opinion of the International Searching Authority received in corresponding International Application No. PCT/EP2016/066235 dated Oct. 27, 2016.
International Preliminary Report on Patentability received in corresponding International Application No. PCT/EP2016/066235 dated Oct. 15, 2018.
Written Opinion of the International Preliminary Examining Authority received in corresponding International Application No. PCT/EP2016/066235 dated Jun. 25, 2018.

* cited by examiner

DEVICE, METHOD AND GRAPHICAL USER INTERFACE FOR DELETING AN OBJECT IN A USER INTERFACE

This application is a national phase of International Application No. PCT/EP2016/066235 filed Jul. 8, 2016 and published in the English language.

TECHNICAL FIELD

The disclosure generally relates to the field of graphical user interfaces and particular it relates to a method of deleting a graphical user interface object, and to a corresponding electronic device and computer program.

BACKGROUND

The use of touch-sensitive surfaces as input devices for computers and other electronic computing devices has increased significantly in recent years. Exemplary touch-sensitive surfaces comprise touch pads and touch screen displays. Such surfaces are widely used to manipulate user interface objects on a display.

Exemplary manipulations comprise creating and deleting user interface objects, adjusting the position and/or size of one or more user interface objects or activating buttons or opening data objects such as files/applications represented by user interface objects, as well as associating metadata with one or more user interface objects or otherwise manipulating user interfaces. Exemplary user interface objects comprise digital images, video, text, icons, control elements such as buttons and other graphics. A user will, in some circumstances, need to perform such manipulations on user interface objects in a file management program, an image management application, a digital content (e.g., videos and music, management application, a drawing application, a presentation application, a word processing application, a website creation application, a disk authoring application, or a spreadsheet application.

But existing methods for performing these manipulations are cumbersome and inefficient. For example, existing methods for deleting a user interface object take longer than necessary, because it involves several steps. The reason for this is that a situation where user interface objects are erroneously deleted should be avoided.

SUMMARY

An object of the present disclosure is to provide methods, devices configured to execute methods, and computer programs which seek to mitigate, alleviate, or eliminate one or more of the above-identified deficiencies in the art and disadvantages singly or in any combination.

This object is achieved by a method, comprising at an electronic device with a touch display and at least one user feedback mechanism performing the following steps; displaying, on the touch display, a user interface comprising at least one user interface object; receiving a touch input applied on the touch display, on one user interface object of the at least one user interface objects; continuing to receive the touch input applied on the touch display, for a first time period; providing, in response to the continuing to receive, a first user feedback, facilitated by one of the at least one of the user feedback mechanisms; continuing to receive the touch input applied on the touch display, for a second time period; providing, in response to the continuing to receive, a second user feedback associated with deletion of the object, using one of the at least one of the user feedback mechanisms; and removing, in response to the continuing to receive, the one user interface object from the user interface.

The methods and interfaces reduce the cognitive burden on a user and produce a more efficient human-machine interface, when deleting user interface objects in a graphical user interface. The method provides a way of deleting user interface objects where the interaction required by the user is minimized a simplified.

According to some aspects, the first user feedback is provided until provision of the second user feedback starts or until the applied touch ends. Hence, the user is efficiently warned about a coming deletion.

According to some aspects, the method further comprises increasing the intensity of the first user feedback until the second user feedback is provided. Increased feedback effectively signals the forthcoming deletion.

According to some aspects, user feedback is at least one of audio feedback, tactile feedback and/or visual feedback.

According to some aspects, the method further comprises removing comprises gradually removing the object from the touch display. Gradual deletion is a way to signal the coming deletion.

According to some aspects, the method further comprises the user interface object is associated with a data object stored in a memory and wherein the removing comprises removing the user interface object and its associated data. Hence, the method provides a simplified interface for freeing up data in the memory.

According to some aspects, the disclosure relates to an electronic device, comprising a touch display at least one user feedback mechanism a touch-sensitive surface; one or more processors; memory; and one or more programs. The one or more programs are stored in the memory and configured to be executed by the one or more processors, the one or more programs including instructions for: displaying, on the touch display, a user interface comprising at least one user interface object; receiving a touch input applied on the touch display, on one user interface object of the at least one user interface objects; continuing to receive the touch input applied on the touch display, for a first time period; providing, in response to the continuing to receive, a first user feedback, facilitated by one of the at least one of the user feedback mechanisms; continuing to receive the touch input applied on the touch display, for a second time period; providing, in response to the continuing to receive, a second user feedback associated with deletion of the object, using one of the at least one of the user feedback mechanisms; and removing, in response to the continuing to receive, the one user interface object from the user interface.

According to some aspects, the one or more programs includes instructions for providing the first user feedback until provision of the second user feedback starts or until the applied touch ends.

According to some aspects, the one or more programs includes instructions for increasing the intensity of the first user feedback increases until the second user feedback is provided.

According to some aspects, the user feedback is at least one of audio feedback, tactile feedback and/or visual feedback.

According to some aspects, the one or more programs includes instructions for gradually removing the object from the touch display.

According to some aspects, the user interface object is associated with a data object stored in a memory, and wherein the one or more programs includes instructions for removing the user interface object and its associated data.

According to some aspects, the disclosure relates to a computer readable storage medium storing one or more programs, the one or more programs comprising instructions, which when executed by an electronic device with a touch display at least one user feedback mechanism a touch-sensitive surface; cause the electronic device to execute any of the aspects of the method described above.

BRIEF DESCRIPTION OF DRAWINGS

Reference is made to the attached drawings, wherein elements having the same reference number designation may represent like elements throughout.

DETAILED DESCRIPTION

Figure 1:
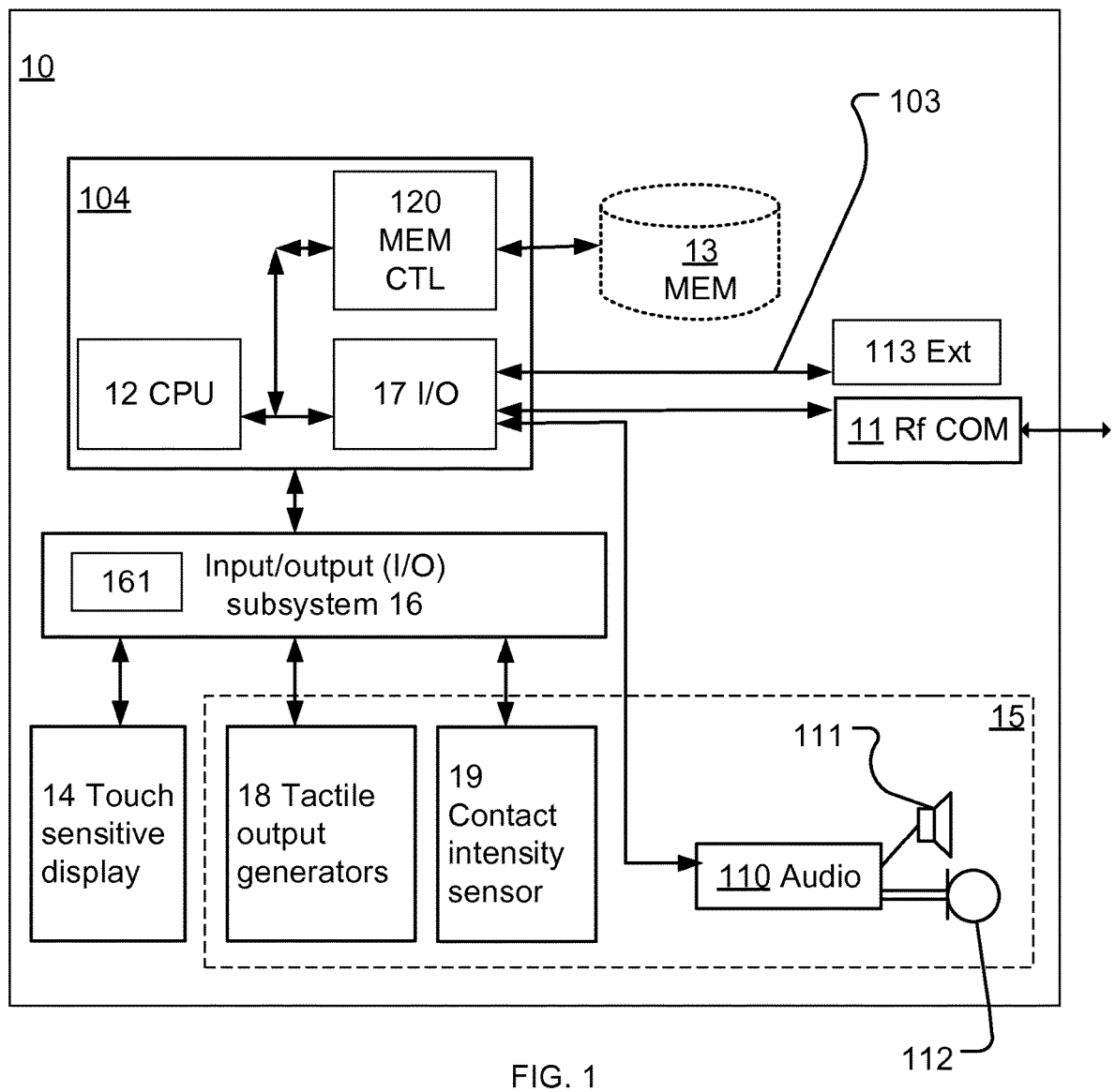
FIG. 1 is a functional block diagram of exemplary components implemented in an exemplary electronic device in which methods described may be implemented.

Aspects of the present disclosure will be described more fully hereinafter with reference to the accompanying drawings. The apparatus and method/s disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and it is not intended to limit the invention. As used herein, the singular forms "a", "an" and "the" are intended to include the plural forms as well, unless the context clearly indicates otherwise.

An electronic device such as a tablet or smartphone typically comprises a menu of applications. Removing applications in such menus is generally rather complicated and requires precision in the touching. This might cause the user not to remove applications, which in turn might cause the memory to get full. To overcome this, the methods, devices and GUIs described herein provide visual, audible and/or tactile feedback that makes deletion of user interface objects more efficient and intuitive for a user.

In the examples below, the proposed methods are described in connection with a portable communications device, such as a mobile telephone, that also contains other functions, such as PDA and/or music player functions. Other portable electronic devices, such as laptops or tablet computers with touch-sensitive surfaces (e.g., touch screen displays and/or touch pads, are, optionally, used. It should also be understood that, in some embodiments, the device is not a portable communications device, but is a desktop computer with a touch-sensitive surface (e.g., a touch screen display and/or a touch pad.

In the discussion that follows, an electronic device that comprises touch display and at least one user feedback mechanism is described. It should be understood, however, that the electronic device optionally comprises one or more other physical user-interface devices, such as a physical keyboard, a mouse and/or a joystick.

The electronic device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

FIG. 1 is a block diagram illustrating components of an electronic device 10 with touch-sensitive displays, in which methods described herein may be implemented. Touch-sensitive display 14 is sometimes called a "touch screen" for convenience, and is sometimes known as or called a touch-sensitive display system.

The electronic device 10 comprises memory 13 (which optionally comprises one or more computer readable storage mediums, memory controller 120, one or more processing units (CPU's, 12, peripherals interface 17, RF circuitry 11, audio circuitry 110, speaker 111, microphone 112, input/output, I/O, subsystem 16, other input or control devices (not shown, and external port 113. The electronic device 10 optionally comprises one or more optical sensors. The electronic device 10 optionally comprises one or more intensity sensors (not shown) for detecting intensity of contacts on the electronic device 10 (e.g., a touch-sensitive surface such as touch-sensitive display system 14 of the electronic device 10. The electronic device 10 optionally comprises one or more tactile output generators 18 for generating tactile outputs on the electronic device 10 (e.g., generating tactile outputs on a touch-sensitive surface such as touch-sensitive display system 14 of the electronic device 10. These components optionally communicate over one or more communication buses or signal lines 103. The electronic device 10 optionally comprises a vibrator 114 configured for causing the electronic device to vibrate. The vibration might be an alternative to sound, when alerting a user about an event.

It should be appreciated that the electronic device 10 is only one example of a portable electronic device, and that the electronic device 10 optionally has more or fewer components than shown, optionally combines two or more components, or optionally has a different configuration or arrangement of the components. The various components shown in FIG. 1 are implemented in hardware, software, or a combination of both hardware and software, including one or more signal processing and/or application specific integrated circuits.

Memory 23 optionally comprises high-speed random access memory and optionally also comprises non-volatile memory, such as one or more magnetic disk storage devices, flash memory devices, or other non-volatile solid-state memory devices. Access to memory 23 by other components of the electronic device 10, such as CPU 12 and the peripherals interface 17, is, optionally, controlled by memory controller 120.

Peripherals interface 17 can be used to couple input and output peripherals of the device to CPU 12 and memory 13. The one or more processors 12 run or execute various software programs and/or sets of instructions stored in memory 13 to perform various functions for the electronic device 10 and to process data. In some embodiments, peripherals interface 17, CPU 12, and memory controller 122 are, optionally, implemented on a single chip, such as chip 104. In some other embodiments, they are, optionally, implemented on separate chips.

RF, radio frequency, circuitry 11 receives and sends RF signals, also called electromagnetic signals. RF circuitry 11 converts electrical signals to/from electromagnetic signals and communicates with communications networks and other communications devices via the electromagnetic signals. RF circuitry 11 optionally comprises well-known circuitry for performing these functions, including but not limited to an antenna system, an RF transceiver, one or more amplifiers, a tuner, one or more oscillators, a digital signal processor, a CODEC chipset, a subscriber identity module, SIM, card, memory, and so forth. RF circuitry 11 optionally communicates with networks, such as the Internet, also referred to as the World Wide Web, WWW, an intranet and/or a wireless network, such as a cellular telephone network, a wireless local area network, LAN, and/or a metropolitan area network, MAN, and other devices by wireless communication. The wireless communication optionally uses any of a plurality of communications standards, protocols and technologies, including but not limited to Global System for Mobile Communications, GSM, Enhanced Data GSM Environment, EDGE, high-speed downlink packet access, HSDPA, high-speed uplink packet access, HSUPA, Evolution, Data-Only, EV-DO, HSPA, HSPA+, Dual-Cell HSPA, DC-HSPDA, long term evolution, LTE, near field communication, NFC, wideband code division multiple access, W-CDMA, code division multiple access, CDMA, time division multiple access, TDMA, Bluetooth, Wireless Fidelity, Wi-Fi, e.g., IEEE 802.11a, IEEE 802.11b, IEEE 802.11g and/or IEEE 802.11n, voice over Internet Protocol, VoIP, Wi-MAX, a protocol for e-mail, e.g., Internet message access protocol, IMAP, and/or post office protocol, POP, instant messaging, e.g., extensible messaging and presence protocol, XMPP, Session Initiation Protocol for Instant Messaging and Presence Leveraging Extensions, SIMPLE, Instant Messaging and Presence Service, IMPS, and/or Short Message Service, SMS, or any other suitable communication protocol, including communication protocols not yet developed as of the filing date of this document.

Audio circuitry 110, speaker 111, and microphone 112 provide an audio interface between a user and the electronic device 10. Audio circuitry 110 receives audio data from peripherals interface 17, converts the audio data to an electrical signal, and transmits the electrical signal to speaker 111. Speaker 111 converts the electrical signal to human-audible sound waves. Audio circuitry 110 also receives electrical signals converted by microphone 112 from sound waves. Audio circuitry 110 converts the electrical signal to audio data and transmits the audio data to peripherals interface 17 for processing. Audio data is, optionally, retrieved from and/or transmitted to memory 13 and/or RF circuitry 11 by peripherals interface 17. In some embodiments, audio circuitry 110 also comprises a headset jack. The headset jack provides an interface between audio circuitry 110 and removable audio input/output peripherals, such as output-only headphones or a headset with both output, e.g., a headphone for one or both ears, and input, e.g., a microphone.

I/O subsystem 16 couples input/output peripherals on the electronic device 10, such as the touch screen 14 and the tactile output generators, but also sensors and other input control devices, to peripherals interface 17. Other input control devices are e.g. physical buttons (e.g., push buttons, rocker buttons, etc., dials) slider switches, joysticks, click wheels, and so forth.

In this disclosure the components for providing an (audio, visible or tactile) interface between a user and the electronic device will commonly be referred to as a user feedback mechanism 15.

Touch-sensitive display 14 provides an input interface and an output interface between the device and a user. A display controller 161 function in the I/O subsystem 16 receives and/or sends electrical signals from/to touch screen 14. Touch screen 14 displays visual output to the user. The visual output optionally comprises graphics, text, icons, video, and any combination thereof (collectively termed "graphics"). Some or all of the visual output corresponds to user-interface objects e.g., one or more soft keys, icons, web pages or images) that are displayed on touch screen 14.

Touch screen 14 has a touch-sensitive surface, sensor or set of sensors that accepts input from the user based on haptic and/or tactile contact. Touch screen 14 and display controller 161, along with any associated modules and/or sets of instructions in memory 13, detect contact, and any movement or breaking of the contact, on touch screen 14 and converts the detected contact into interaction with user-interface objects (e.g., one or more soft keys, icons, web pages or images) that are displayed on touch screen 14. In an exemplary embodiment, a point of contact between touch screen 14 and the user corresponds to a finger of the user.

The touch screen 14 optionally uses liquid crystal display, LCD, technology, light emitting polymer display, LPD, technology, or light emitting diode, LED, technology, although other display technologies are used in other embodiments. Touch screen 14 and display controller 161 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 14. In an exemplary embodiment, projected mutual capacitance sensing technology is used.

The user optionally makes contact with touch screen 14 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

Electronic device 10 optionally also comprises one or more tactile output generators 18. FIG. 1 shows a tactile output generator coupled to I/O subsystem 16. Tactile output generator 18 optionally comprises one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). A contact intensity sensor 19 receives tactile feedback generation instructions from haptic feedback module 133 and generates tactile outputs on electronic device 10 that are capable of being sensed by a user of device 10. In some embodiments, at least one tactile output generator is collocated with, or proximate to, a touch-sensitive surface (e.g., touch-sensitive display system 14) and, optionally, generates a tactile output by moving the touch-sensitive surface vertically (e.g., in/out of a surface of electronic device 10) or laterally (e.g., back and forth in the same plane as a surface of electronic device 10). In some embodiments, at least one tactile output generator sensor is located on the back of electronic device 10, opposite touch screen display 14 which is located on the front of electronic device 10.

The software components stored in memory 102 comprise for example operating system, communication module (or set of instructions), contact/motion module (or set of instructions), graphics module (or set of instructions), text input module (or set of instructions), Global Positioning System (GPS) module (or set of instructions), and applications (or sets of instructions).

Operating system (e.g., Darwin, RTXC, LINUX, UNIX, OS X, WINDOWS, or an embedded operating system such as VxWorks) comprises various software components and/or drivers for controlling and managing general system tasks (e.g., memory management, storage device control, power management, etc.) and facilitates communication between various hardware and software components.

Applications optionally comprise the following modules (or sets of instructions), or a subset or superset thereof: contacts module (sometimes called an address book or contact list); telephone module; video conferencing module; e-mail client module; instant messaging (IM) module; workout support module; camera module for still and/or video images; image management module; browser module; calendar module; widget modules, which optionally comprise one or more of: weather widget, stocks widget, calculator widget, alarm clock widget, dictionary widget, and other widgets obtained by the user, as well as user-created widgets, widget creator module for making user-created widgets; search module; video and music player module, which is, optionally, made up of a video player module and a music player module notes module; map module; and/or online video module.

Examples of other applications that are, optionally, stored in memory 102 comprise other word processing applications, other image editing applications, drawing applications, presentation applications, JAVA-enabled applications, encryption, digital rights management, voice recognition, and voice replication.

The graphics module comprises various known software components for rendering and displaying graphics on touch screen 14 or other display, including components for changing the visual impact (e.g., brightness, transparency, saturation, contrast or other visual property) of graphics that are displayed. As used herein, the term "graphics" comprises any object that can be displayed to a user, including without limitation text, web pages, icons (such as user-interface objects including soft keys), digital images, videos, animations and the like.

In some embodiments, graphics module stores data representing graphics to be used. Each graphic is, optionally, assigned a corresponding code. Graphics module receives, from applications etc., one or more codes specifying graphics to be displayed along with, if necessary, coordinate data and other graphic property data, and then generates screen image data to output to display controller 161.

Figure 2:
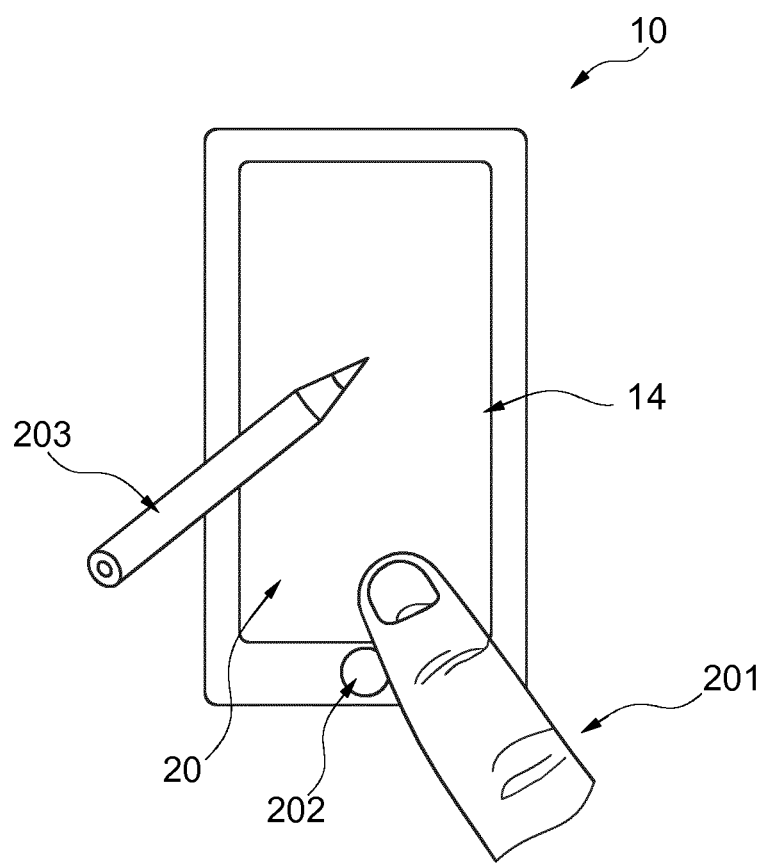
FIG. 2 is an illustration of the exemplary electronic device of FIG. 1.

FIG. 2 illustrates the electronic device 10 having a touch screen 14. The touch screen optionally displays one or more graphics within user interface, UI, 20. In this embodiment, as well as others described below, a user is enabled to select one or more of the graphics by making a gesture on the graphics, for example, with one or more fingers 201 or one or more styluses 202. In some embodiments, selection of one or more graphics occurs when the user breaks contact with the one or more graphics. In some embodiments, the gesture optionally comprises one or more taps, one or more swipes (from left to right, right to left, upward and/or downward) and/or a rolling of a finger (from right to left, left to right, upward and/or downward) that has made contact with electronic device 10. In some implementations or circumstances, inadvertent contact with a graphic does not select the graphic. For example, a swipe gesture that sweeps over an application icon optionally does not select the corresponding application when the gesture corresponding to selection is a tap.

The electronic device 10 optionally comprises one or more physical buttons, such as "home" or menu button 203. As described previously, menu button 203 is, optionally, used to navigate to any application in a set of applications that are, optionally executed on the electronic device 10. Alternatively, in some embodiments, the menu button is implemented as a soft key in a GUI displayed on touch screen 14.

Figure 3:
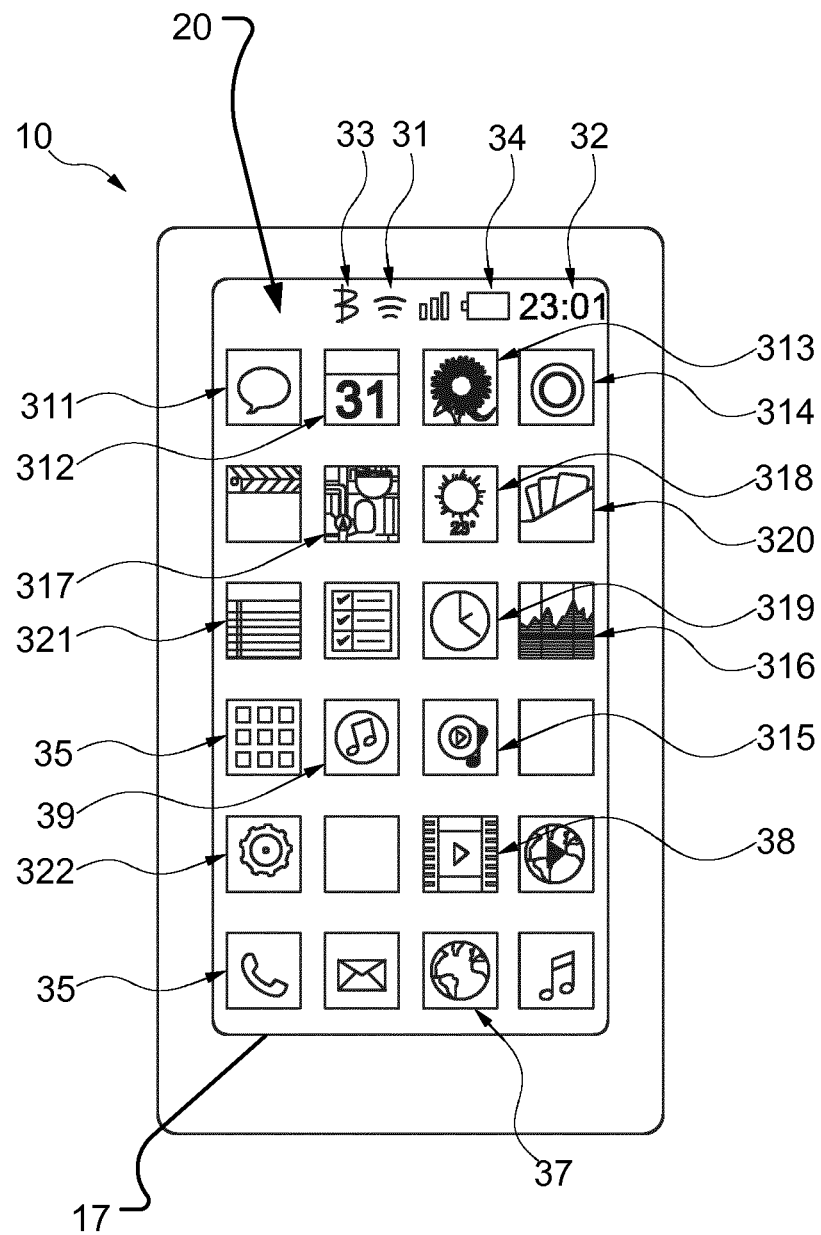
FIG. 3 is an illustration of an exemplary user interface of the exemplary electronic device of FIG. 1.

FIG. 3 illustrates an exemplary user interface for a menu of applications on the electronic device 10, where the proposed technique may be implemented. In some embodiments, user interface 20 comprises the following user interface objects, or a subset or superset thereof: Signal strength indicator(s) 31 for wireless communication(s), such as cellular and Wi-Fi signals; Time 32; Bluetooth indicator 33 and Battery status indicator 34.

The user interface objects typically also comprises user interface objects i.e. icons, corresponding to a number of applications such as; a telephone application 35, which optionally comprises an indicator of the number of missed calls or voicemail messages; e-mail application 36, which optionally comprises an indicator of the number of unread e-mails; browser application 37, and video player 38 and music player 39.

Other applications are e.g. messaging application 311, calendar application 312, image application 313, camera application 314, online video application 315, stocks application 316, map application 317, weather application 318, alarm clock application 319, workout application 320, notes application 321 and settings application 322. It should be noted that the icon labels illustrated in FIG. 3 are merely exemplary and that the proposed method might be applied on any user interface object.

In some embodiments, a label for a respective application icon comprises a name of an application corresponding to the respective application icon. In some embodiments, a label for a particular application icon is distinct from a name of an application corresponding to the particular application icon.

The proposed technique will now be described referring to the user interface 20 of FIG. 3. However, in order to better understand the proposed methods, problems associated with deleting user interface objects will be briefly discussed.

Deleting user interface objects on a graphical user interface, UI, such as a touch screen can have a perceived threshold, due to cumbersome user experience.

Two common delete/uninstall scenarios for UI objects are commonly used on e.g. smartphones and tablets. A first scenario is that a user applies a long touch on a user interface object, wherein the long touch causes the user interface object to wiggle and a small cross is shown in the upper right corner of the user interface object. The user has to let go from long press when wiggling commences and manage to hit the minimal cross to delete the user interface object. This might be difficult, because of the size of the cross. If hitting the cross fails, the user might need to redo the long touch.

However, this scenario is maybe better than a second alternative, where the user is supposed to apply a long press icon until icon "comes lose" and drag is enabled. User then has to drag this icon over the entire screen, up to the "Uninstall/Delete" icon. If user's finger moistness is a bit off, the user will "drop" the icon too early and instead of getting into the trash bin, it is just rearranged within its grid.

The idea is to use one longer press be the sole action needed to delete one item. In order to avoid accidental deletion, user feedback such as vibration, sound, light etc., is used to notify the user that something is happening. Typically the intensity of the feedback increases by time. A final user feedback having a special effect e.g. a subtle "BANG", "POP" will let the user know that the object is really deleted. Possibly the user may then have an option to regret the deletion.

FIGS. 4a to 4e illustrate an example user flow in an electronic device 10 e.g. the electronic device of FIG. 1. One or more programs are stored in the memory and configured to be executed by the one or more processors.

Figure 4:
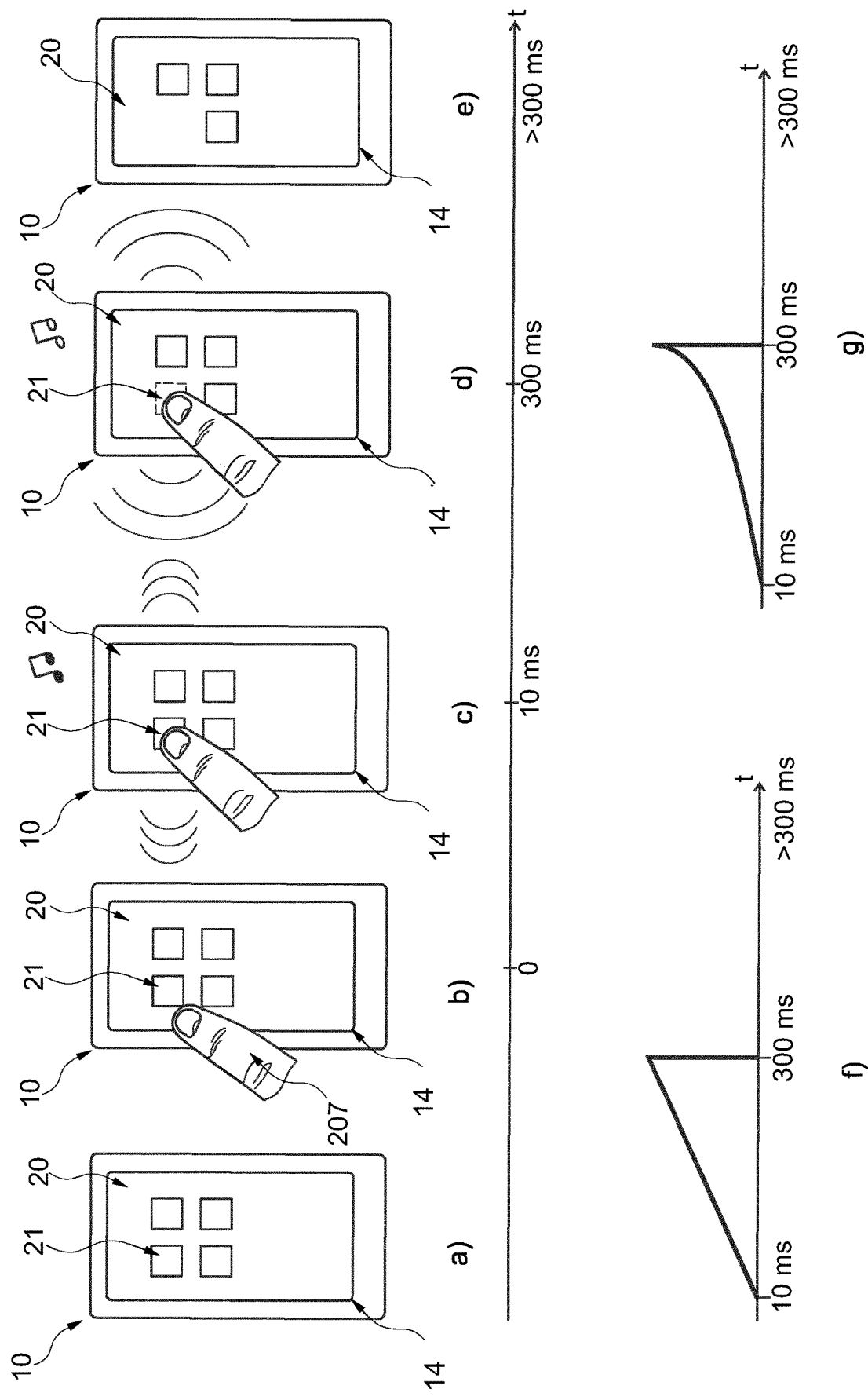
FIGS. 4a to 4e illustrate example user flow in an electronic device 10 according to an example embodiment.
FIGS. 4f and 4g illustrate examples of how the intensity of the first user feedback varies as a function of time.

FIG. 4a illustrates a user interface object 21 being displayed on the user interface 20 of the electronic device 10. The user interface object is e.g. an icon of an application or a thumbnail of an image. Hence, the one or more programs in the electronic device comprise instructions for displaying, on the touch display, a user interface comprising at least one user interface object.

Deletion of the user interface object 21 is initiated when a user puts finger on the icon that he or she wants to delete, as shown in FIG. 4b. Then the electronic device 10 detects the presence of the finger on the touch display 14 using e.g. the hardware described in connection with FIG. 1. The electronic device continues to register the presence during a first time period and after expiry it starts providing feedback to the user. The purpose of the user feedback is to notify the user about that a delete action is started. The first time period is typically quite short e.g. 10 ms. The first time period should be a short time, which is however long enough to differentiate the touch from a normal touch, applied to start the application. In other words, the one or more programs in the electronic device includes instructions for receiving a touch input applied on the touch display, on one user interface object of the at least one user interface objects and continuing to receive the touch input applied on the touch display, for a first time period. According to some aspects, several objects could be pressed and deleted in parallel.

Hence, after expiry of the first time period, the user will, if the touch input remains, feel or receive a user feedback such as a vibration, as illustrated in FIG. 4c. There might also additionally be a sound and any other user feedback. The user feedback is typically generated using the microphone 111, the tactile output generators 18 or the touch sensitive display 14 (see FIG. 1), which would then be the user feedback mechanisms. Hence, the one or more programs includes instructions for providing, in response to the continuing to receive, a first user feedback, facilitated by one of the at least one of the user feedback mechanisms. According to some aspects, the user feedback is at least one of audio feedback, tactile feedback and/or visual feedback. For example, the electronic device starts to vibrate or the touched icon starts to wobble. If the user does not intend to delete the user interface object, he or she has the possibility to release the touch, and then the user feedback will end and the deletion is interrupted.

The user feedback is provided during a second time period while the finger remains on the item. Hence, the one or more programs further comprise instructions for continuing to receive the touch input applied on the touch display, for a second time period. According to some aspects, the one or more programs includes instructions for providing the first user feedback until provision of the second user feedback starts or until the applied touch ends. During the second time period the user feedback e.g. vibration will sometimes increase in intensity, as illustrated in FIG. 4d. The item will perhaps slightly shake visually or light up or shade out. Hence, according to some aspects, the one or more programs includes instructions for increasing the intensity of the first user feedback increases until the second user feedback is provided. After a few hundred milliseconds, the vibration intensity will spike in (as illustrated by the curve of FIG. 4g), to indicate the actual deletion. Hence, the one or more programs further comprise instructions for providing, in response to the continuing to receive, a second user feedback associated with deletion of the object, using one of the at least one of the user feedback mechanisms, as shown in FIG. 4e. The second user feedback e.g. corresponds to that a user will experience the deletion as popping a bubble. If there is a sound connected to it, the sound will signal that the item has been deleted.

The one or more programs further comprise instructions for removing, in response to the continuing to receive, the one user interface object from the user interface. Hence, the item will be removed from the graphical user interface. According to some aspects, the one or more programs further comprise instructions for gradually removing one user interface from the touch display. Gradually removing comprises e.g. fading out or blinking out or the like. For example one user interface starts to fade out during the second time period and is completely removed when the touch has remained for the second time period.

According to some aspects, the user interface object is associated with a data object stored in the memory 13, and then the one or more programs includes instructions for removing the user interface object and its associated data. In other words, when the user interface object 21 is removed from the user interface 20 its associated data is also removed. This might correspond to that an application is uninstalled or that a media object such as an image or a movie is removed from the memory 23.

After completion of the method the user interface object, and its associated data, is removed from the portable electronic device 10. However, there might be a possibility to undo the deletion.

Figure 5:
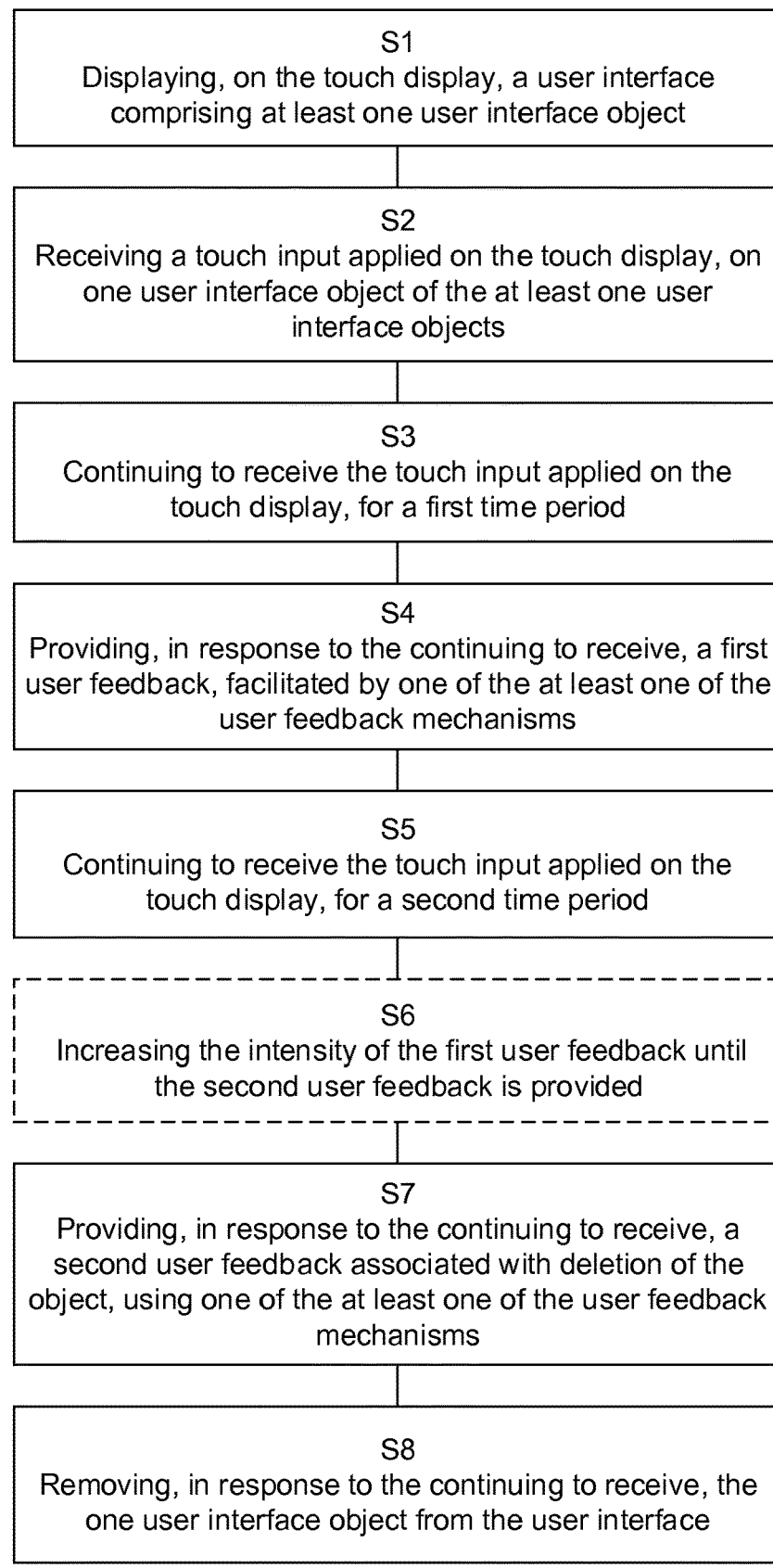
FIG. 5 is a flow chart illustrating example operations according to some example embodiments.

FIG. 5 is a flow diagram illustrating a method deleting a user interface object at a touch display of an electronic device with a touch display and at least one user feedback mechanism in accordance with some embodiments. The method is performed at an electronic device (e.g., device 10, FIG. 1) with a display and a touch-sensitive surface. According to some aspects, the display is a touch screen display and the touch-sensitive surface is on the display. According to some aspects, the display is separate from the touch-sensitive surface. Some operations in method are, optionally, combined and/or the order of some operations is, optionally, changed.

As described below, the method provides an intuitive way to delete user interface objects from a user interface. For example deleting applications from an application menu or deleting photos in a photo application in a smartphone or tablet.

The method comprises displaying 51, on the touch display, a user interface comprising at least one user interface object. In other words, a graphical user interface is created and presented to the user on the touch display 14. The user interface object is configured enable a user to distinguish the applications from each other and to enable a user to perform acts relating to the individual user interface objects. Examples of acts are starting the application or displaying an image associated with the user interface object. This is typically done by representing the user interfaces with individual icons on the user interface.

According to some aspects graphical user interface is a menu of applications. According to some aspects the user interface is a view of data stored in the memory 23.

The method further comprises receiving S2 a touch input applied on the touch display, on one user interface object of the at least one user interface objects. In other words, presence of an object such as a finger or a stylus is detected by the touch display 14 as described in connection with FIG. 1. The touch of a user interface indicates that the user wants to perform an action associated with the user interface object. In accordance with the proposed technique a touch applied for a certain time period corresponds to the act of deleting the user interface object and its associated data. Hence, the following steps serve the purpose of identifying such as touch and to communicate with the user in order to assure that this is actually the intent.

Hence, the method further comprises continuing S3 to receive the touch input applied on the touch display, for a first time period. Stated differently, the touch screen continuously detects that the applied touch remains. When a first time period has expired since the touch was applied, an event occurs. The duration of the first time period can be set as suitable for the specific application.

If the touch is release before the expiry of the first time period that might correspond to another act, such as starting the application, or displaying a photo in the examples above.

The method further comprises providing S4, in response to the continuing to receive, a first user feedback, facilitated by one of the at least one of the user feedback mechanisms. Hence, after touch input being applied to a user interface object for a first period, at provision of at least one user input is triggered. Providing a first user feedback implies that a user feedback mechanism such as the tactile output generators, loud speaker 111 or vibrator 114 is cause to generate a user feedback. If the method is executed by the CPU 12, this means that the CPU sends a signal to the user feedback mechanism over the peripherals interface 17 or I/O, subsystem 16. The user feedback is an indication to the user that the object will soon be deleted.

The method further comprises continuing S5 to receive the touch input applied on the touch display, for a second time period. In other words, the touch display 12 continues to detect that the touch is still applied until a second time period has expired. When the touch has been applied for the first and second time periods, it is considered a confirmation that the user wants to delete the object. Hence, the application of the touch input for the first and second time periods is the only action required from the user in order to delete the user interface object and its associated data.

According to some aspects, the method comprises increasing S6 the intensity of the first user feedback until the second user feedback is provided. In other words, to make the indication even more significant, the user feedback's intensity might gradually increase, as illustrated by the curve of FIG. 4f. For example the amplitude of the vibration, audio or lightning increases.

According to some aspects, the first user feedback is provided until provision of the second user feedback starts or until the applied touch ends. Hence, any time during the second time period, the user has the possibility to release the touch. In such case the method will and, and no further action is performed. Hence, in the applied touch is interrupted before the end of the second time period, the deletion is interrupted.

The method further comprises providing S7, in response to the continuing to receive, a second user feedback associated with deletion of the object, using one of the at least one of the user feedback mechanisms. The second user feedback informs the user about the deletion of the object. At about the same time, the user interface object disappears from the screen.

In other words, the method further comprises removing S8, in response to the continuing to receive, the one user interface object from the user interface. The purpose of the removal is that acts relating to the deleted user interface object cannot be performed anymore. In way that the user cannot start the application or view the image.

According to some aspects, the removing S8 comprises gradually removing the object from the touch display. Hence, the user interface object might start to fade out already before the expiry of the second time period.

According to some aspects, the user interface object is associated with a data object stored in a memory and wherein the removing S8 comprises removing the user interface object and its associated data. The reason why the user wants to remove an object might be to free memory space. Hence, the deletion might involve also deleting data associated with the user interface object. This corresponds e.g. to uninstalling an application or removing an image from the memory.

After removing there might be different ways of restoring the deleted object. According to some aspects, an icon ("undo delete") appears on the screen for a short period after the deletion. The user may then undo an accidental deletion by pressing this icon.

According to some aspects, the first and/or second user feedback is at least one of audio feedback, tactile feedback and/or visual feedback. The first and second user feedbacks might be different types of feedback. For example the first user feedback is vibration and the second feedback is audio.

According to some aspects, the functionality may be activated or deactivated e.g. in the settings application 332.

Figure 6:
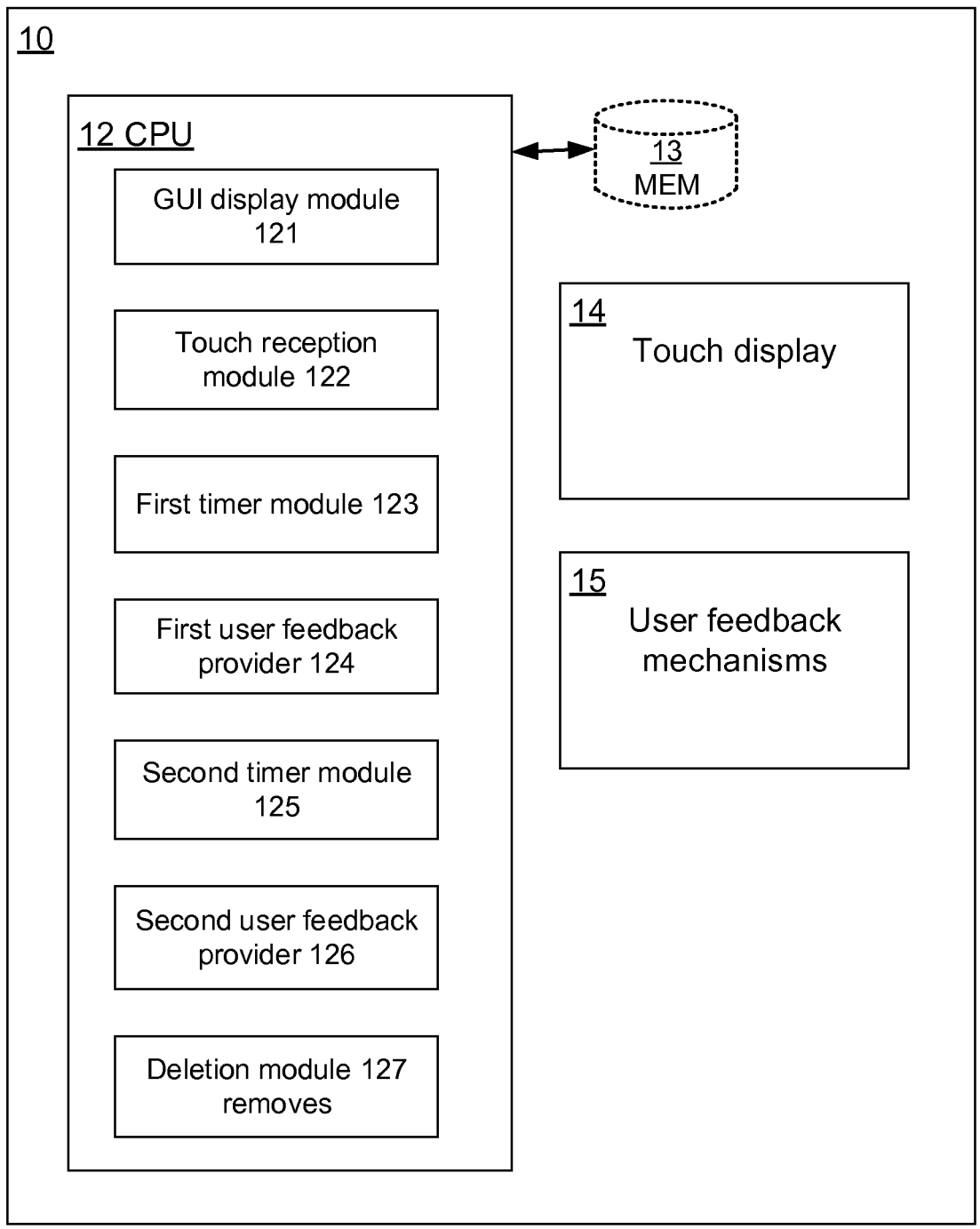
FIG. 6 is a block diagram illustrating an example electronic device according to some example embodiments.

In accordance with some embodiments, FIG. 6 shows a functional block diagram of an electronic device 10 configured in accordance with the principles of the various described aspects. The functional blocks of the device are, optionally, The functional blocks of the device are, optionally, implemented by hardware, software, or a combination of hardware and software to carry out the principles of the various described embodiments. It is understood by persons of skill in the art that the functional blocks described in FIG. 6 are, optionally, combined or separated into sub-blocks to implement the principles of the various described embodiments. Therefore, the description herein optionally supports any possible combination or separation or further definition of the functional blocks described herein.

As shown in FIG. 6, an electronic device 10 includes a touch display 14 at least one user feedback mechanism 15, one or more processors 12 and memory 13. The electronic device further comprises one or more programs stored in the memory 13 and configured to be executed by the one or more processors 12. The one or more programs includes instructions for displaying, on the touch display, a user interface comprising at least one user interface object; receiving a touch input applied on the touch display, on one user interface object of the at least one user interface objects; continuing to receive the touch input applied on the touch display, for a first time period; providing, in response to the continuing to receive, a first user feedback, facilitated by one of the at least one of the user feedback mechanisms; continuing to receive the touch input applied on the touch display, for a second time period; providing, in response to the continuing to receive, a second user feedback associated with deletion of the object, using one of the at least one of the user feedback mechanisms; and removing, in response to the continuing to receive, the one user interface object from the user interface.

According to some aspects, the one or more programs includes instructions for providing the first user feedback until provision of the second user feedback starts or until the applied touch ends.

According to some aspects, the one or more programs includes instructions for increasing the intensity of the first user feedback increases until the second user feedback is provided.

According to some aspects, the user feedback is at least one of audio feedback, tactile feedback and/or visual feedback.

According to some aspects, the one or more programs include instructions for gradually removing the object from the touch display.

According to some aspects, the user interface object is associated with a data object stored in a memory, and wherein the one or more programs include instructions for removing the user interface object and its associated data.

The operations in the information processing methods described above are, optionally implemented by running one or more functional modules in information processing apparatus such as general purpose processors (e.g., as described above with respect to FIG. 1) or application specific chips.

The operations described above with reference to FIG. 5 are, optionally, implemented by components depicted in FIGS. 1 or FIG. 6.

A GUI display module 121 displays, on the touch display, a user interface comprising at least one user interface object. Touch reception module 122 receives a touch input applied on the touch display, on one user interface object of the at least one user interface objects. First timer module 123 continues to receive the touch input applied on the touch display, for a first time period. First user feedback provider 124 provides, in response to the continuing to receive, a first user feedback, facilitated by one of the at least one of the user feedback mechanisms. Second timer module 125 continues to receive the touch input applied on the touch display, for a second time period. Second user feedback provider 126 provides, in response to the continuing to receive, a second user feedback associated with deletion of the object, using one of the at least one of the user feedback mechanisms. Deletion module 127 removes, in response to the continuing to receive, the one user interface object from the user interface.

Similarly, it would be clear to a person having ordinary skill in the art how other processes can be implemented based on the components depicted in FIG. 1.

Aspects of the disclosure are described with reference to the drawings, e.g., block diagrams and/or flowcharts. It is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that performs particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The invention claimed is:

1. A method, comprising:
at an electronic device with a touch display and at least one user feedback mechanism:
displaying, on the touch display, a user interface including a plurality of user interface objects;
receiving a touch input applied on the touch display on two user interface objects of the plurality of user interface objects;
continuing to receive the touch input applied on the touch display for a first time period;
providing, in response to the continuing to receive, a first user feedback facilitated by one of the at least one user feedback mechanisms;
continuing to receive the touch input applied on the touch display for a second time period;
increasing an intensity of the first user feedback until a second user feedback associated with deletion of the two user interface objects is provided;
providing, in response to the continuing to receive the touch input for the second time period, the second user feedback using one of the at least one user feedback mechanisms; and
removing, in response to the continuing to receive, the two user interface objects from the user interface.

2. The method of claim 1, wherein the first user feedback is provided until provision of the second user feedback starts.

3. The method of claim 1, wherein the user feedback is at least one of audio feedback, tactile feedback and/or visual feedback.

4. The method of claim 1, wherein the removing comprises gradually removing the two user interface objects from the touch display.

5. The method of claim 1, wherein the two user interface objects are associated with respective data objects stored in a memory and wherein the removing includes removing the user interface objects and their associated data.

6. An electronic device, comprising:
a touch display;
at least one user feedback mechanism;
one or more processors; and
a computer memory circuit storing instructions that when executed by one or more processors cause the electronic device to perform operations including:
displaying, on the touch display, a user interface including a plurality of user interface objects;
receiving a touch input applied on the touch display on two user interface objects of the plurality of user interface objects;
continuing to receive the touch input applied on the touch display for a first time period;
providing, in response to the continuing to receive, a first user feedback facilitated by one of the at least one user feedback mechanisms;
continuing to receive the touch input applied on the touch display for a second time period;
increasing an intensity of the first user feedback until a second user feedback associated with deletion of the two user interface objects is provided;
providing, in response to the continuing to receive the touch input for the second time period, the second user feedback using one of the at least one user feedback mechanisms; and
removing, in response to the continuing to receive, the two user interface objects from the user interface.

7. The electronic device of claim 6, wherein the operations further include providing the first user feedback until provision of the second user feedback starts.

8. The electronic device of claim 6, wherein the user feedback is at least one of audio feedback, tactile feedback and/or visual feedback.

9. The electronic device of claim 6, wherein the removing includes gradually removing the two user interface objects from the touch display.

10. The electronic device of claim 6, wherein the two user interface objects are associated with respective data objects stored in the computer memory circuit and wherein the removing includes removing the two user interface objects and their associated data.

11. A non-transitory computer-readable medium storing instructions that when executed by an electronic device with a touch display and at least one user feedback mechanism cause the electronic device to perform operations including:
displaying, on the touch display, a user interface including a plurality of user interface objects;
receiving a touch input applied on the touch display on two user interface objects of the plurality of user interface objects;
continuing to receive the touch input applied on the touch display for a first time period;
providing, in response to the continuing to receive, a first user feedback facilitated by one of the at least one user feedback mechanisms;
continuing to receive the touch input applied on the touch display, for a second time period;
increasing an intensity of the first user feedback until a second user feedback associated with deletion of the two user interface objects is provided;
providing, in response to the continuing to receive the touch input for the second time period, the second user feedback using one of the at least one user feedback mechanisms; and
removing, in response to the continuing to receive, the two user interface objects from the user interface.

12. The computer-readable storage medium of claim 11, wherein the user feedback is at least one of audio feedback, tactile feedback and/or visual feedback.

13. The computer-readable storage medium of claim 11, wherein the removing includes gradually removing the two user interface objects from the touch display.

14. The computer-readable storage medium of claim 11, wherein the two user interface objects are associated with respective data objects stored in a memory, and wherein the removing includes removing the two user interface objects and their associated data.

* * * * *